US012747160B2

(12) United States Patent
Yoon et al.

(10) Patent No.: US 12,747,160 B2
(45) Date of Patent: Sep. 29, 2026

(54) METHOD FOR PURIFYING IODOSILANES

(71) Applicant: ENTEGRIS, INC., Billerica, MA (US)

(72) Inventors: SungCheol Yoon, Hwaseong-si (KR); HyunHo Jung, Hwaseong-si (KR); JongWon Nam, Pyeongtaek-si (KR); Shane Nunes, Cedar Park, TX (US); Pei Zhao, Leander, TX (US); Anthony D. Ozzello, Round Rock, TX (US)

(73) Assignee: Entegris, Inc., Billerica, MA (US)

( * ) Notice: Subject to any disclaimer, the term of this patent is extended or adjusted under 35 U.S.C. 154(b) by 795 days.

(21) Appl. No.: 17/724,992

(22) Filed: Apr. 20, 2022

(65) Prior Publication Data

US 2022/0340430 A1 Oct. 27, 2022

Related U.S. Application Data

(60) Provisional application No. 63/177,666, filed on Apr. 21, 2021.

(51) Int. Cl.
*C01B 33/107* (2006.01)

(52) U.S. Cl.
CPC .............................. *C01B 33/10778* (2013.01)

(58) Field of Classification Search
CPC .......... C01B 33/10778; B01D 2325/42; B01D 67/00931; C02F 1/444; C02F 2101/103; C02F 2101/14; C02F 2101/20; C02F 2103/346; C23C 16/325; C23C 16/345; C23C 16/402; C23C 16/4402; C23C 16/45553
See application file for complete search history.

(56) References Cited

U.S. PATENT DOCUMENTS

| | | | | |
|---|---|---|---|---|
| 6,379,551 B1 * | 4/2002 | Lee | C08J 5/225 210/651 |
| 2012/0183464 A1 | 7/2012 | Mueh et al. | |
| 2016/0115593 A1 | 4/2016 | Kuchenbeiser et al. | |
| 2016/0264426 A1 | 9/2016 | Kerrigan et al. | |
| 2017/0247265 A1 | 8/2017 | Fujita et al. | |
| 2018/0099872 A1 * | 4/2018 | Ritter | C01B 33/107 |
| 2018/0290109 A1 | 10/2018 | Jaber et al. | |
| 2020/0206691 A1 | 7/2020 | Jaber et al. | |

FOREIGN PATENT DOCUMENTS

| | | | | |
|---|---|---|---|---|
| EP | 3056262 A1 * | 8/2016 | C01B 33/10778 |
| JP | 2013061426 A | 4/2013 | |
| KR | 101134230 B1 * | 4/2012 | C01B 33/10778 |
| WO | 8400353 A1 | 2/1984 | |
| WO | 2003072221 A1 | 9/2003 | |
| WO | 2017201456 A1 | 11/2017 | |

OTHER PUBLICATIONS

Marinas et al. EP3056262A1 English (Year: 2016).*
Kim et al. KR101134230B1 English (Year: 2012).*
Emeleus, H. J. et al., Derivatives of Monosilane, Part II, The Iodo-compounds, Journal of Chem. Society, 1941, pp. 353-358.
Kohyama, Purification of Metals from Organic Solvents, pp. 1-4, 2010.

* cited by examiner

*Primary Examiner* — Sally A Merkling
*Assistant Examiner* — Jordan W Taylor

(57) ABSTRACT

Provided is a method for purification of iodosilanes, such as diiodosilane. In this method, trace amounts of certain metal ion contaminants are removed, thus providing certain liquid compositions comprising the iodosilanes, which can be used advantageously in the deposition of silicon-containing films onto microelectronic device substrates.

14 Claims, 2 Drawing Sheets

METHOD FOR PURIFYING IODOSILANES

TECHNICAL FIELD

This invention belongs to the field of vapor deposition of microelectronic device substrates. More particularly, it relates to a method for the purification of diiodosilane, which is useful as a precursor in the atomic layer deposition of silicon dioxide films.

BACKGROUND

Low temperature deposition of silicon-based thin-films is of fundamental importance to current semiconductor device fabrication and processes. For the last several decades, $SiO_2$ thin films have been utilized as essential structural components of integrated circuits (ICs), including microprocessor, logic and memory-based devices. $SiO_2$ has been a predominant material in the semiconductor industry and has been employed as an insulating dielectric material for virtually all silicon-based devices that have been commercialized. $SiO_2$ has been used as an interconnect dielectric, a capacitor and a gate dielectric material over the years.

The conventional industry approach for depositing high-purity $SiO_2$ films has been to utilize tetraethylorthosilicate (TEOS) as a thin-film precursor for vapor deposition of such films. TEOS is a stable liquid material that has been employed as a silicon source reagent in chemical vapor deposition (CVD), plasma-enhanced chemical vapor deposition (PECVD) and atomic layer deposition (ALD), to achieve high-purity thin-films of $SiO_2$. Other thin-film deposition methods (e.g., focused ion beam, electron beam and other energetic means for forming thin-films) can also be carried out with this silicon source reagent.

As integrated circuit device dimensions continually decrease, with corresponding advances in lithography scaling methods and shrinkage of device geometries, new deposition materials and processes are correspondingly being sought for forming high integrity $SiO_2$ thin films. Improved silicon-based precursors (and co-reactants) are desired to form $SiO_2$ films, as well as other silicon-containing thin films, e.g., $Si_3N_4$, SiC, and doped $SiO_x$ high k thin films which can be deposited at low temperatures, for example temperatures below 400° C.

The achievement of low temperature films also requires the use and development of deposition processes that ensure the formation of homogeneous conformal silicon-containing films. Chemical vapor deposition (CVD) and atomic layer deposition (ALD) processes are therefore being refined and implemented, concurrently with the ongoing search for reactive precursor compounds that are stable in handling, vaporization and transport to the reactor, but exhibit the ability to decompose cleanly at low temperatures to form the desired thin films. The fundamental challenge in this effort is to achieve a balance of precursor thermal stability and precursor suitability for high-purity, low temperature film growth processes.

Halosilanes are useful as precursors in the manufacturing of microelectronic devices; in particular, halosilanes such as $H_2SiI_2$ and $HSiI_3$ are useful as precursor compounds for the deposition of silicon-containing films used in the manufacture of microelectronic devices. Current solution based synthetic methodology describes the synthesis of $H_2SiI_2$ and other select iodosilanes from (i) aryl silanes (Keinan et al. J. Org. Chem., Vol. 52, No. 22, 1987, pp. 4846-4851; Kerrigan et. al. U.S. Pat. No. 10,106,425 or (ii) halosilanes such as $SiH_2Cl_2$ (U.S. Pat. No. 10,384,944).

Keinan et al. describe a synthetic method towards $SiH_2I_2$ formation that employs stoichiometric treatment of Phenyl-$SiH_3$, an arylsilane, with iodine in the presence of a catalyst such as ethyl acetate. The reaction by-products are the aromatic function from the arylsilane, liberated as benzene, and a complicated by-product mixture resulting from ethyl acetate decomposition. Tedious separation of the reaction by-products from the desired $SiH_2I_2$ complicates the process. In addition, arylsilane-based methods for preparing halosilanes typically generate product contaminated with iodine and/or hydrogen iodide, which are deleterious to the desired iodosilane product, so often antimony, silver, or copper are utilized to stabilize the iodosilane product.

As noted above, diiodosilane is a precursor compound useful in the atomic layer deposition of silicon-containing films onto microelectronic device substrates, in particular, silicon dioxide. In such applications, it is highly advantageous that the precursor compound be as free from impurities as possible, because trace metals cause degradation of diiodosilane over time. Accordingly, a need remains for the purification of halosilanes such as diiodosilane so that its use as a vapor deposition precursor compound and its effective storage can be optimized.

SUMMARY OF THE INVENTION

In summary, the invention provides a method for purification of various iodosilanes. In this method, trace amounts of certain metal ion contaminants are removed and provide certain liquid compositions comprising the iodosilanes, which can thus be used advantageously in the deposition of silicon-containing films onto microelectronic device substrates. In one aspect, the invention provides a method of removing one or more metal(s) and/or metal ion(s) from a liquid composition, said liquid composition comprising an iodo-substituted silane chosen from monoiodosilane, diiodosilane, triiodosilane, tetraiodosilane, monoiododisilane, diiododisilane, triiododisilane, tetraiododisilane, pentaiododisilane, and hexaiododisilane, the method comprising: contacting a filter material with the liquid composition comprising the iodo-substituted silane having one or more metals and/or metal ions as impurities, the filter material comprising at least one hydrophilic functional group, thereby reducing the amount of the one or more metals or metal ions in the liquid composition.

DETAILED DESCRIPTION

Figure 1:
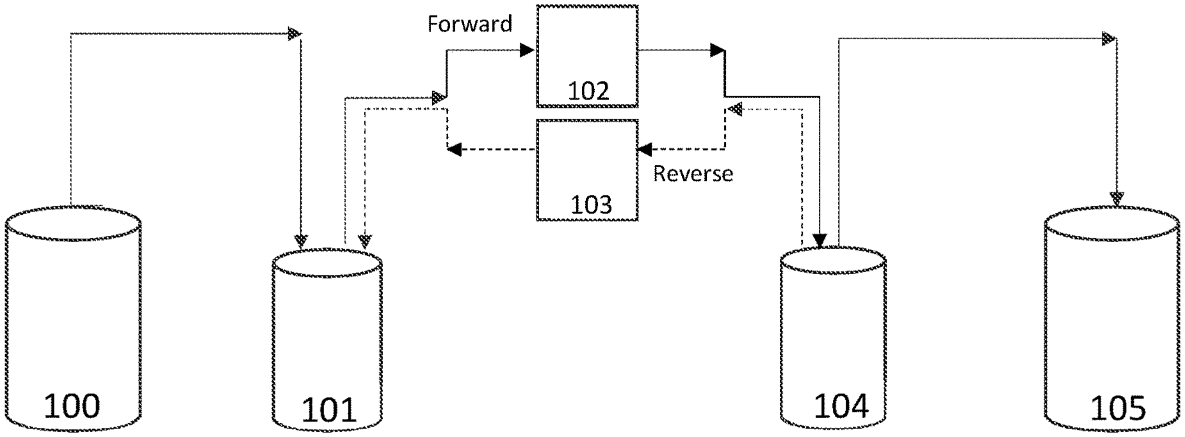
FIG. 1 is a process flow diagram illustrating the operation of one embodiment of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g., 1 to 5 includes 1, 1.5, 2, 2.75, 3, 3.80, 4 and 5).

Filters are used to remove unwanted materials from a flow of a useful fluid and have become important features in a wide variety of industrial technologies. Fluids that are treated to remove unwanted materials include water, liquid industrial solvents and processing fluids, industrial gases used for manufacturing or processing, and liquids that have medical or pharmaceutical uses. Unwanted materials that are removed from fluids include impurities and contaminants such as particles, microorganisms, and dissolved chemical species. Specific examples of filter applications include their use with liquid materials for semiconductor and microelectronic device manufacturing.

Filters can remove unwanted materials by a variety of different ways, such as by size exclusion or by chemical and/or physical interaction with material. Some filters are defined by a structural material providing a porous architecture to the filter, and the filter is able to trap particles of a size that are not able to pass through the pores. Some filters are defined by the ability of the structural material of the filter, or of a chemistry associated with the structural material, to associate and interact with materials that pass over or through the filter. For example, chemical features of the filter may enable association with unwanted materials from a stream that passes over the filter, trapping those unwanted materials such as by ionic, coordinative, chelation, or hydrogen-bonding interactions. Some filters can utilize both size exclusion and chemical interaction features to remove materials from a filtered stream.

In some cases, to perform a filtration function, a filter includes a filter membrane that is responsible for removing unwanted material from a fluid that passes through. The filter membrane may, as required, be in the form of a flat sheet, which may be wound (e.g., spirally), flat, pleated, or disk-shaped. The filter membrane may alternatively be in the form of a hollow fiber. The filter membrane can be contained within a housing or otherwise supported so that fluid that is being filtered enters through a filter inlet and is required to pass through the filter membrane before passing through a filter outlet.

As used herein, a "filter," refers to an article having a structure that includes filter material. For example, the filter can be in any useful form for a filtering process, including for example the form of a porous non-woven membrane.

The filter can be in any desired form suitable for a filtering application. Material that forms the filter can be a structural component of a filter itself and that provides the filter with a desired architecture. The filter can be porous and can be of any desired shape or configuration. The filter per se can be a unitary article such as a non-woven fiber membrane or can be represented by a plurality of individual articles.

In some embodiments, the filter material is formed from a polymeric material, a mixture of different polymeric materials, or a polymeric material and a non-polymeric material. In certain embodiments, the polymeric material is in the form of a non-woven fiber, forming a membrane. Polymeric materials forming the filter can be crosslinked together to provide a filter structure with a desired degree of integrity. Such polymeric materials form the backbone for the hydrophobic (e.g., ion exchange) functional groups which serve to actively filter the metal ion contaminants.

Polymeric materials that can be used to form filter material of filters of the disclosure include various polymers. In some embodiments, the filter material is a membrane and includes a polyolefin or a halogenated polymer. Exemplary polyolefins include polyethylene (PE), polypropylene (PP), polymethylpentene (PMP), polybutene (PB), polyisobutylene (PIB), and copolymers of two or more of ethylene, propylene, and butylene. In a further particular embodiment, filter material includes ultra-high molecular weight polyethylene (UPE). UPE filter materials, such as UPE membranes, are typically formed from a resin having a molecular weight (weight average molecular weight) greater than about $1\times10^6$ Daltons (Da), such as in the range of about $1\times10^6$-$9\times10^6$ Da, or $1.5\times10^6$-$9\times10^6$ Da. Crosslinking between polyolefin polymers such as polyethylene can be promoted by use of heat or crosslinking chemicals, such as peroxides (e.g., dicumyl peroxide or di-tert-butyl peroxide), silanes (e.g., trimethoxyvinylsilane), or azo ester compounds (e.g., 2,2'-azo-bis(2-acetoxy-propane). Exemplary halogenated polymers include polytetrafluoroethylene (PTFE), polychlorotrifluoro-ethylene (PCTFE), fluorinated ethylene polymer (FEP), polyhexafluoropropylene, and polyvinylidene fluoride (PVDF).

In other embodiments, the filter material includes a polymer chosen from ultra high molecular weight polyethylenes, polyamides, polyimides, polysulfone, polyether-sulfone, polyarylsulfone polyacrylates, polymethacrylates, polyesters, celluloses, cellulose esters, polycarbonates, polystyrenes, poly(styrene-divinyl benzene), or combinations thereof. In one embodiment, the filter material is poly (tetrafluoroethylene).

In other embodiments, the filter can be a composite filter, which is comprised of a first filter membrane of the disclosure, used in combination with a filter membrane which is different from the first filter membrane.

The filter material can be made of any suitable material or combination of materials. As noted above, exemplary filter materials can include one or more polymers. Further, the material of the filter may have a chemistry suitable for attachment of a hydrophilic group via grafting or via coating with a coating having such hydrophilic group(s). In one embodiment, the hydrophilic groups are chosen from acids, bases, and ionic groups. In another embodiment, the hydrophilic group is an ion exchange group.

For example, a sulfonic acid functional group can be introduced at the surface of the filter material (e.g., a filter membrane) by immersing the material to a mixture of a monomer solution comprising 0.3% Irgacure 2959 (UV catalyst), acrylamidomethylpropane sulfonic acid (AMPS), methylene bis acrylamide (MBAm) cross linker, methanol, and water, and thereafter exposing the thus-coated filter material to ultraviolet radiation to effect curing (i.e., crosslinking) of the coating. The filter material so prepared will thus possess sulfonic acid functional groups. Similarly, filter membranes having phosphonic acid groups can be prepared utilizing vinyl phosphonic acid as a reactive monomer.

Porous polymeric membranes having ion exchange moieties at the polymer surface can remove metal and metal ion contaminants in a solution that is passing through the membrane, as well as any material that is of a size too large to pass through the pores of the membrane. For example, commercially-available ion exchange filters such as Protego® Plus DI (Entegris, Inc.) can be utilized. Other examples of commercially-available membranes useful in the method of the invention include those sold by ASTOM Corporation and Membranes International Inc.

In one embodiment, the membrane will comprise at least one such ion exchange group by type or structure, but it will be appreciated that the number of such ion exchange groups and their filtering characteristics may be adjusted to suit the desired purity of the resulting purified liquid composition comprising a halogen-substituted silane.

In one embodiment, the functionalized membranes are based on hydrophilic, functionalized, nonwoven fabric manufactured by graft polymerization. The membrane type has a higher density of ion-exchange groups on the surface of the media which allows the ion exchange to function effectively. The raw materials used to prepare diiodosilanes contain multivalent metal impurities such as Al, Ca, Cr, Au, Fe, Ni, Na, Ti, and Zn, in trace amounts, which have a tendency to form metal ions or charged colloids. The membranes of the invention efficiently capture such metal ions and small colloids due to electrostatic interaction.

In this regard, the iodo-substituted silanes, e.g., diiodosilane compositions, may be purified to remove virtually all metal cations which, as noted above, contribute to an undesired disproportionation reaction over time (i.e., while stored). In the practice of the invention, the composition of diiodosilane to be purified is either contacted with the membrane of the invention or is allowed to pass through the membrane in order to remove undesired metal cation contaminants, such as Al, Ca, Cr, Au, Fe, Ni, Na, Ti, and Zn. The diiodosilane composition may be utilized neat, or as a dilute solution in an inert solvent such as pentane, hexane, and heptane.

Accordingly, in a first aspect, the invention provides a method of removing one or more metal(s) and/or metal ion(s) from a liquid composition, said liquid composition comprising an iodo-substituted silane chosen from monoiodosilane, diiodosilane, triiodosilane, tetraiodosilane, monoiododisilane, diiododisilane, triiododisilane, tetraiododisilane, pentaiododisilane, and hexaiododisilane, the method comprising: contacting a filter material with the liquid composition comprising the iodo-substituted silane having one or more metals and/or metal ions as impurities, the filter material comprising at least one hydrophilic functional group; thereby reducing the amount of the one or more metals or metal ions in the liquid composition.

In one embodiment, the iodo-substituted silane is diiodosilane. In one embodiment, the liquid composition comprising diiodosilane is allowed to pass through the filter material.

In one embodiment, the method of the invention provides liquid compositions comprising diiodosilane, which contains about 100 to about 1000 ppb of metals chosen from Al, Ca, Cr, Au, Fe, Ni, Na, Ti, and Zn. In another embodiment, about 40 to about 90 weight percent of metal and/or metal ion contaminants are removed.

In another aspect, the invention provides purified liquid compositions comprising the halogen-substituted silanes which have been subjected to the method of the invention and thus afford purified iodosilane compositions having parts per billion levels of various metal impurities, which compositions exhibit superior stability upon storage compared to control samples. In one embodiment, such purified compositions comprise about 100 to about 500 ppb total of metals chosen from Al, Ca, Cr, Au, Fe, Ni, Na, Ti, and Zn. In one embodiment, the liquid composition comprises diiodosilane. In another embodiment, the liquid composition comprising diiodosilane contains no more than about 100 ppb total of metals chosen from Ca, Cr, Fe, Ni, and Ti. In another embodiment, the liquid composition comprising diiodosilane contains no more than about 50 ppb total of metals chosen from Ca, Cr, Fe, and Ni.

In this regard, reference to the metals in this disclosure is intended to also include their corresponding cations, i.e., $Al^{+3}$, $Ca^{+2}$, $Na^{+}$, $Fe^{+2}$ and $Fe^{+3}$, and $Ni^{+2}$.

FIG. 1 depicts a process flow diagram of one embodiment of the invention. In the RM Tank (100), the Process Tank A (101), the Filter-A system (102), the Filter-B system (103), the Process Tank-B (104), and the FG Tank (105).

Figure 2:
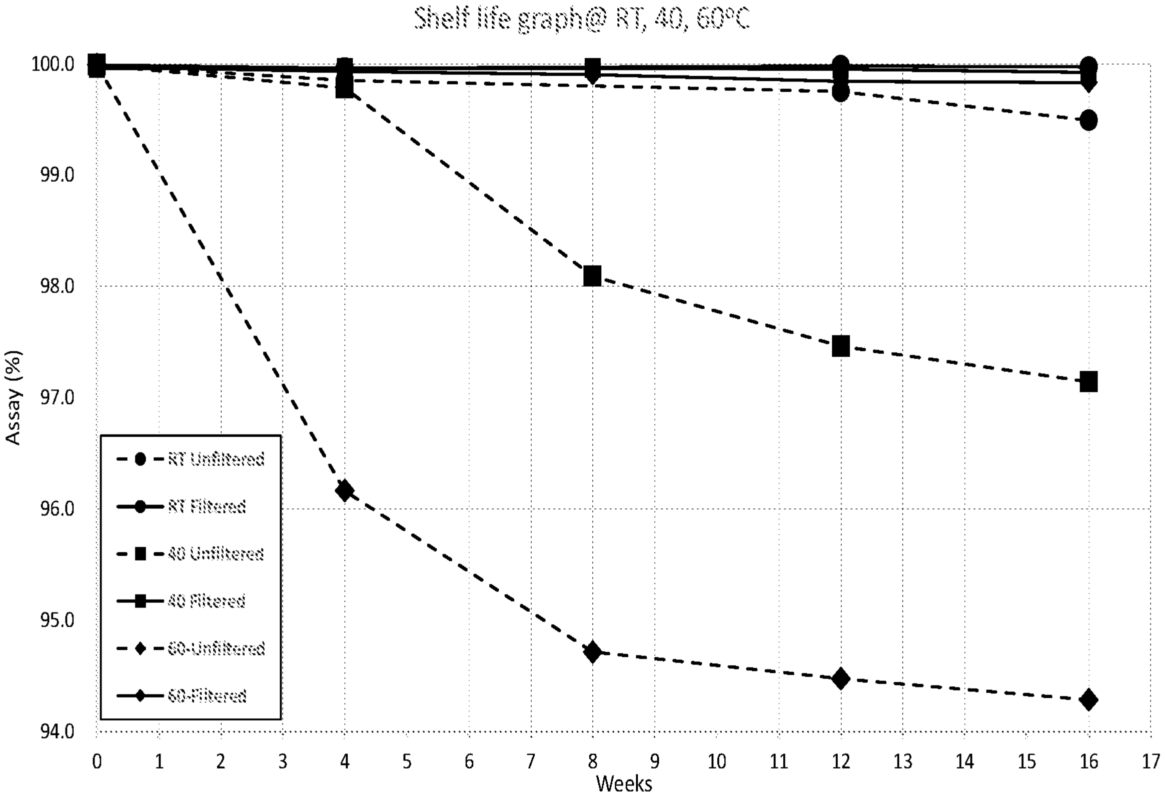
FIG. 2 is a graph of assay (%) for diiodosilane versus time (weeks), illustrating the (stability) performance of the purified diiodosilane samples at different filtration temperatures versus control samples. In the accompanying legend, RT Unfiltered refers to a control (i.e., unfiltered) sample of diiodosilane at room temperature. RT Filtered refers to a room temperature sample which has been purified according to the invention. Similarly, "40" refers to the corresponding samples maintained at 40° C., and "60" refers to the corresponding samples maintained at 60° C.

FIG. 2 illustrates the shelf-life of diiodosilane which has been purified according to the method of the invention, compared to a control sample, at room temperature, i.e., about 23° C., 40° C., and 60° C., over a period of 16 weeks. This graph illustrates the greatly-improved stability of the diiodosilane composition which has been so purified. This result was surprisingly achieved without prior or subsequent distillation of the desired diiodosilane.

EXAMPLES

Example 1

The purification process set forth in FIG. 1 illustrates a configuration of Process Tank A and B, and Filter-A and B and system A. The filter system A (102) and B (103) are comprised of a filter cartridge with hydrophilic functionalized membrane and filter housing with stainless steel cylinder. A nitrogen inlet gas is connected to both Process Tanks A and B, and the filtration process is conducted under a dry nitrogen atmosphere. A pre-determined amount of diiodosilane raw material in the RM Tank (100) is transferred into Process Tank A (101). The incoming flow of diiodosilane raw material under nitrogen gas pressure enters the inlet port of Filter-A system (102) and passes through the filter membrane cartridge in filter housing and is discharged from the outlet port of the Filter-A system (102) into Process tank B (104). This forward process will keep running until all diiodosilane raw material in Process Tank A (101) is depleted, while monitoring the weight of Process Tank A (101). As for the reverse process, the diiodosilane raw material in Process Tank B (104) under nitrogen gas pressure enters the inlet port of the Filter-B system (103) and passes through the filter membrane cartridge in the filter housing and is discharged from the outlet port of the Filter-B system (103) and passes through the filter membrane cartridge in the filter housing and is discharged from the outlet port of Filter-B system (103) into Process Tank A (101). This reverse process would keep running until all diiodosilane raw material in Process Tank B (104) is depleted with monitoring the weight of Process Tank B (104). The filtration loop cycle is then repeated about 5 to about 10 times. Finally, a chosen amount of purified diiodosilane material in Process Tank B is transferred into FG Tank (105).

The functionalized membranes are based on hydrophilic functionalized, nonwoven fabrics prepared by grafting. The resulting membrane has a high density of ion-exchange functional groups on its surface which allows the ion-exchange moieties to function effectively. The diiodosilane raw material contains multivalent metal impurities such as Al, Ca, Cr, Au, Fe, Ni, Na, Ti, and Zn which have a tendency to form charged colloids. The ion-exchange functionalized membranes were found to efficiently capture metal ions and small colloids.

In the method of the invention and the examples below, the liquid compositions comprising diiodosilane and the stated amounts of metallic impurities was passed through an Entegris Protego® Plus DI filter at room temperature, at a flow rate of about 0.2 to about 0.5 liters per minute, or a residence time in the ion exchange filter membrane of about 4 to about 10 minutes. The liquid compositions so purified were analyzed to provide the data set forth below.

Example 2—Analysis of Trace Metal Content

The Table 1 below provides details for the results of the filtration of diiodosilane using the membranes of the invention in parts per billion (ppb):

TABLE 1

| Element | RM-1 | Run-1 | RM-2 | Run-2 | RM-3 | Run-3 | RM-4 | Run-4 |
|---|---|---|---|---|---|---|---|---|
| Al | 11.504 | 0.934 | 11.504 | 2.253 | 2.006 | 0.623 | 0.700 | 0.700 |
| Ca | 18.200 | 2.141 | 18.200 | 0.544 | 1.768 | 1.887 | 1.000 | 1.000 |
| Cr | 3.142 | 0.358 | 3.142 | 0.000 | 13.253 | 0.590 | 4.233 | 0.600 |
| Au | 0.000 | 0.000 | 0.000 | 0.000 | 36.556 | 13.429 | 1.400 | 1.400 |
| Fe | 32.393 | 6.376 | 32.393 | 12.584 | 148.538 | 21.397 | 67.086 | 4.900 |
| Ni | 2.969 | 0.902 | 2.969 | 0.321 | 33.431 | 0.776 | 5.887 | 0.300 |
| Na | 10.077 | 0.776 | 10.077 | 0.161 | 2.901 | 0.349 | 0.550 | 0.567 |
| Ti | 8.269 | 1.767 | 8.269 | 0.244 | 1.632 | 1.062 | 1.944 | 2.145 |
| Zn | 9.009 | 8.462 | 9.009 | 0.517 | 3.072 | 0.645 | 2.300 | 3.771 |

*RM-1 and RM-2 are starting compositions of diiodosilane from the same lot; RM-3 is starting composition from a different lot.

Example 3—Shelf-Life Test in EP Stainless Steel Cylinders

In this example, diiodosilane was subjected to filtration according to Example 1, and compared to diiodosilane which was not (control). The data, as shown in FIG. 2, indicates that the filtered diiodosilane of Example 1 was able to sustain a ≥99.9% purity as determined by gas chromatography, (a) (i) at room temperature, and (ii) at 40° C. for four months and (b) 60° C. for two months storage in a stainless steel cylinder. Detailed results are as follows:

TABLE 2

| Sample | | Initial Assay | 4 Weeks | 8 Weeks | 12 Weeks | 16 Weeks | (−) Rxn. Rate, per week** |
|---|---|---|---|---|---|---|---|
| RT | Control | 99.99* | 99.85 | | 99.75 | 99.49 | 0.031% |
| | Filtered | 99.99 | 99.96 | | 99.98 | 99.97 | 0.001% |
| 40° C. | Control | 99.99 | 99.78 | 98.09 | 97.46 | 97.14 | 0.178% |
| | Filtered | 99.96 | 99.96 | 99.96 | 99.95 | 99.92 | 0.003% |
| 60° C. | Control | 99.99 | 96.16 | 94.71 | 94.47 | 94.28 | 0.357% |
| | Filtered | 99.97 | 99.93 | 99.90 | 99.84 | 99.83 | 0.009% |

*All data were obtained based on Gas Chromatography peak integration for varying time periods stored in EP Stainless Steel Cylinders

**Reaction Rate (%) = $[(A_{initial} - A_{time})/A_{initial}]$/Time × 100 (A: assay value)

Table 3 shows every monthly based purity for both filtered and control samples as determined by gas chromatography, (a) (i) at room temperature, and (ii) at 40° C. and (b) 60° C., for seven months storage in a stainless steel cylinder. The data, as shown in Table 3, indicates that the filtered diiodosilane of Example 1 was able to sustain a ≥99.9% purity as determined by gas chromatography, (a) at room temperature for seven months, and (b) at 40° C. for five months, and (c) 60° C. for two months storage in a stainless steel cylinder.

As for disproportionation reaction rate per month, as shown in Table 3, the filtered sample showed (a) 0.003% (−)RR at room temperature, (b) 0.013% (−)RR at 40° C. for seven months, and (c) 0.032% (−)RR at 60° C. for six months. This result indicates that the filtered sample showed disproportionation rate (a) 70 times less than the control sample at room temperature and showed disproportionation reaction rate (b) around 40 times less than the control sample at 40° and 60° C.

TABLE 3

| T | Pre-T* | Initial Assay | Month 1 | Month 2 | Month 3 | Month 4 | Month 5 | Month 6 | Month 7 | **RR 1 | ***RR 2 |
|---|---|---|---|---|---|---|---|---|---|---|---|
| RT | C | 99.99 | 99.85 | | 99.75 | 99.49 | 98.98 | | | −0.202 | −0.051 |
| | F | 99.99 | 99.96 | | 99.98 | 99.97 | 99.97 | 99.97 | 99.97 | −0.003 | −0.0007 |
| 40° C. | C | 99.99 | 99.78 | 98.09 | 97.46 | 97.14 | | | 96.52 | −0.496 | −0.124 |
| | F | 99.96 | 99.96 | 98.98 | 99.95 | | 99.90 | 99.87 | 99.87 | −0.013 | −0.003 |
| 60° C. | C | 99.99 | 96.16 | 94.71 | 94.47 | 94.28 | | | | −1.428 | −0.357 |
| | F | 99.97 | 99.93 | 99.90 | 99.84 | 99.83 | | 99.78 | | −0.032 | −0.008 |

*Pretreatment consisted of either control (C) or after filtration using the membrane/filter of the invention (F)

**Reaction Rate (per Month) by percentage

***Reaction Rate (per Week) by percentage

Aspects

In a first aspect, the invention provides a method of removing one or more metal(s) and/or metal ion(s) from a liquid composition, said liquid composition comprising an iodo-substituted silane chosen from monoiodosilane, diiodosilane, triiodosilane, tetraiodosilane, monoiododisilane, diiododisilane, triiododisilane, tetraiododisilane, pentaiododisilane, and hexaiododisilane, the method comprising:

- contacting a filter material with the liquid composition comprising the iodo-substituted silane having one or more metals and/or metal ions as impurities, the filter material comprising at least one hydrophilic functional group chosen from acidic, basic, and ionic groups; thereby reducing the amount of the one or more metals or metal ions in the liquid composition.

In a second aspect, the invention provides the method of the first aspect, wherein the filter material comprises a membrane.

In a third aspect, the invention provides the method of the first aspect, wherein the hydrophilic functional group is an ion exchange group.

In a fourth aspect, the invention provides the method of the first aspect, wherein the iodo-substituted silane is diiodosilane.

In a fifth aspect, the invention provides the method of any one of the first four aspects, wherein the liquid composition comprising diiodosilane comprises no more than about 100 ppb to about 500 ppb of metals chosen from Al, Ca, Cr, Au, Fe, Ni, Na, Ti and Zn.

In a sixth aspect, the invention provides the method of any one of the first through fifth aspects, whereby about 40 to about 90% of metal and/or metal ion contaminants are removed.

In a seventh aspect, the invention provides a liquid composition comprising an iodo-substituted silane containing no more than about 30 ppb of total of metals chosen from Ca, Cr, Fe, and Ni.

In an eighth aspect, the invention provides a liquid composition wherein the iodo-substituted silane is diiodosilane, and wherein said compositions contains no more than about 100 ppb total of metals chosen from Ca, Cr, Fe, Ni, and Ti.

In a ninth aspect, the invention provides the liquid composition of the seventh aspect, wherein the iodo-substituted silane is diiodosilane, and wherein said composition contains no more than 50 ppb total of metals chosen from Ca, Cr, Fe, and Ni.

In a tenth aspect, the invention provides the liquid composition of the seventh aspect, wherein the iodo-substituted silane is diiodosilane, and wherein said composition contains no more than about 30 ppb total of metals chosen from Ca, Cr, Fe, and Ni.

In an eleventh aspect, the invention provides a composition comprising diiodosilane having (−) reaction rates less than 0.020 percent calculated by Formula 1 using a gas chromatograph assay data measured at less than room temperature, wherein Formula 1 is: Reaction Rate (percentage)+ $[(A_{initial}-A_{time})/A_{initial}]/\text{Time}\times 100$, wherein A is the gas chromatography assay percentage.

In a twelfth aspect, the invention provides a composition comprising diiodosilane having (−) reaction rates less than 0.05 percent calculated by Formula 1 as set forth in the eleventh aspect measured at between room temperature and 40° C.

In a thirteenth aspect, the invention provides a composition comprising diiodosilane having (−) reaction rates less than 0.100 percent calculated by Formula 1 as set forth in the eleventh aspect using gas chromatography data measured at between 40° C. and 60° C.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. The disclosure's scope is, of course, defined in the language in which the appended claims are expressed.

What is claimed is:

1. A method of removing one or more metal(s) and/or metal ion(s) from a liquid composition, said liquid composition comprising an iodo-substituted silane chosen from monoiodosilane, diiodosilane, triiodosilane, tetraiodosilane, monoiododisilane, diiododisilane, triiododisilane, tetraiododisilane, pentaiododisilane, and hexaiododisilane, the method comprising: contacting a filter material with the liquid composition comprising the iodo-substituted silane having one or more metals and/or metal ions as solubilized impurities, the filter material comprising at least one hydrophilic functional group chosen from acidic, basic and ionic groups; thereby reducing the amount of the one or more metals or metal ions in the liquid composition; wherein the filtered liquid composition with reduced metal ions demonstrates improved stability over time compared with an unfiltered control, and wherein the filtered liquid composition is greater than 99.5% pure after 12 weeks at 60 °C, while the unfiltered control is less than 95% pure after 12 weeks at 60 °C.

2. The method of claim 1, wherein the filter material comprises a membrane.

3. The method of claim 1, wherein the hydrophilic functional group is an ion exchange group.

4. The method of claim 1, wherein the iodo-substituted silane is diiodosilane.

5. The method of claim 1, wherein the liquid composition comprising diiodosilane comprises no more than about 100 ppb to about 500 ppb of metals chosen from Al, Ca, Cr, Au, Fe, Ni, Na, Ti, and Zn.

6. The method of claim 1, whereby about 40 to about 90% of metal and/or metal ion contaminants are removed.

7. The method of claim 1, further comprising contacting the filter material with the liquid composition comprising the iodo-substituted silane multiple times.

8. The method of claim 7, wherein the multiple times comprises about 5 to about 10 times.

9. The method of claim 1, wherein the one or more metals and/or metal ions as solubilized impurities include one or more of Ca, Cr, Fe, Ni, and/or Ti.

10. The method of claim 1, wherein the one or more metals and/or metal ions as solubilized impurities include one or more of Ca, Cr, Fe, and/or Ni.

11. A method of purifying an iodo-substituted silane solution comprising: repeatedly contacting a filter material comprising a hydrophilic functional group with the iodo-substituted silane solution, such that solubilized metal ions in the iodo-substituted silane solution are reduced; wherein the iodo-substituted silane solution with reduced metal ions demonstrates improved stability over time compared with an unfiltered control, and wherein the filtered iodo-substituted silane solution with reduced metal ions is greater than 99.5% pure after 12 weeks at 60 °C while the unfiltered control is less than 95% pure after 12 weeks at 60 °C.

12. A method of enhancing the stability of iodo-substituted silane solutions comprising:

removing metal ions from the iodo-substituted silane solution by contacting the solution with a filter material, the filter material comprising at least one hydrophilic functional group chosen from acidic, basic and ionic groups; thereby reducing the amount of the one or more metals or metal ions in the solution, wherein the iodo-substituted silane solution includes one or more of monoiodosilane, diiodosilane, triiodosilane, tetraiodosilane, diiododisilane, triiododisilane, tetraiododisilane, pentaiododisilane, and hexaiododisilane; and wherein a filtered solution with reduced metal ions demonstrates improved stability over time compared with an unfiltered control, wherein the filtered solution is greater than 99.5% pure after 12 weeks at 60 °C, while the unfiltered control is less than 95% pure after 12 weeks at 60 °C.

13. The method of claim 12, wherein removing metal ions from the iodo-substituted solution comprises repeatedly contacting the solution with the filter material.

14. The method of claim 13, wherein repeatedly contacting the solution with the filter material comprises contacting five to ten times with the filter material.

* * * * *